Sept. 24, 1968     R. BOTTON ET AL     3,402,999
PROCESS AND APPARATUS FOR THE PREPARATION OF AMMONIA AND
CHLORINE FROM AMMONIUM CHLORIDE
Filed March 2, 1965     2 Sheets-Sheet 1

INVENTORS
ROGER BOTTON
ADRIEN DELCOIGNE
BY
Bauer and Seymour
ATTORNEYS

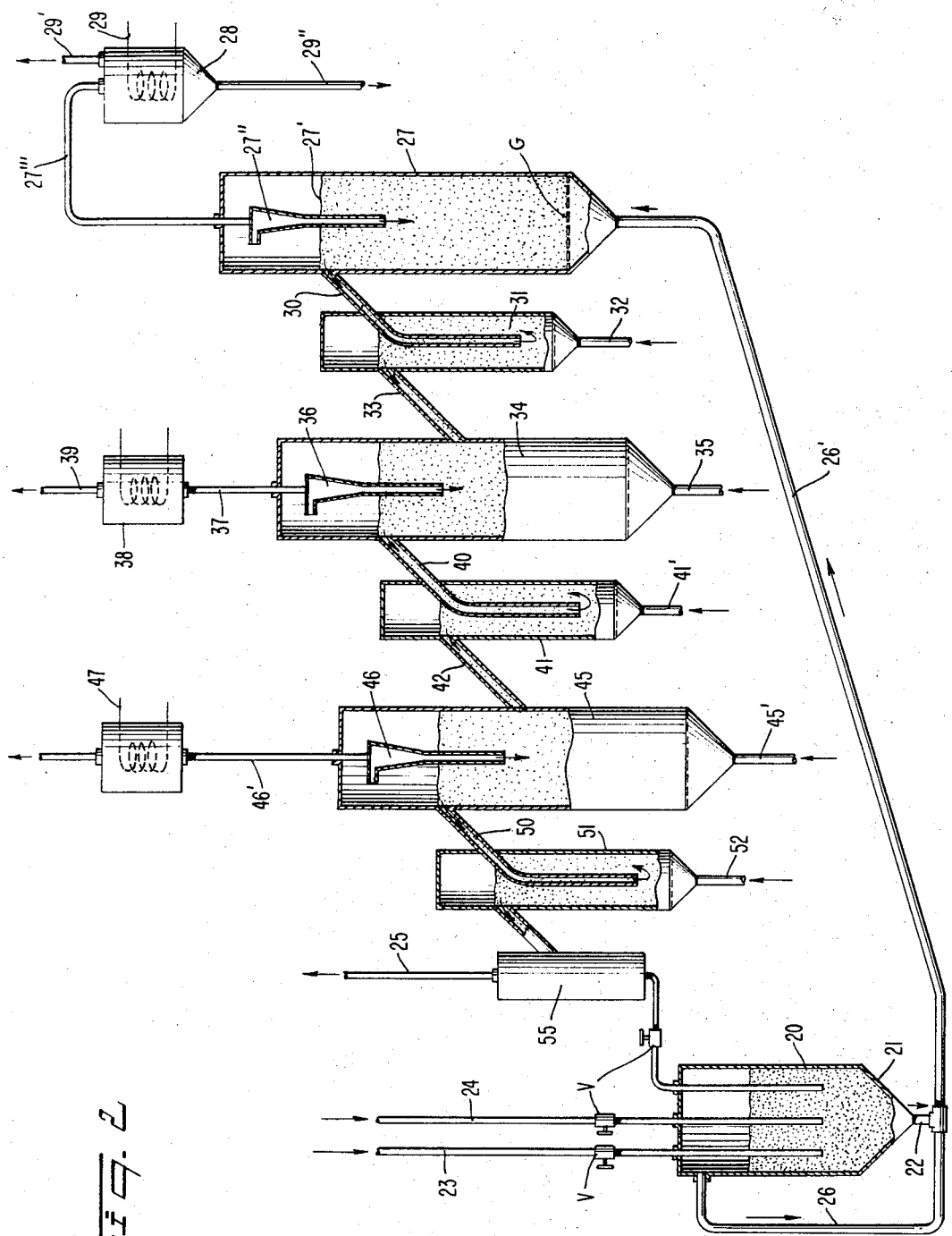

United States Patent Office 3,402,999
Patented Sept. 24, 1968

3,402,999
PROCESS AND APPARATUS FOR THE PREPARATION OF AMMONIA AND CHLORINE FROM AMMONIUM CHLORIDE
Roger Botton, Paris, and Adrien Delcoigne, Chantilly, France, assignors to Produits Chimiques Pechiney-Saint Gobain, Paris, France
Filed Mar. 2, 1965, Ser. No. 436,563
Claims priority, application France, Mar. 3, 1964, 965,896; June 22, 1964, 979,153
5 Claims. (Cl. 23—193)

ABSTRACT OF THE DISCLOSURE

Process and apparatus for production of $NH_3$ and Cl from $NH_4Cl$, either by continuous or by intermittent procedures, using particulate reactive masses fluidified by reactive gases, assisted by inert gas. (1) $NH_4Cl$ is sublimed at 350° to 500° C. in presence of partly reduced $Fe_2O_3$ and/or $Mn_2O_3$ as catalyst, and the resulting ammonia is separated and collected. (2) Resulting $FeCl_2$ is mixed at 450° to 650° C., with $O_2$ to liberate Cl, which is collected. (3) Resulting $Fe_2O_3$ and/or $Mn_2O_3$ is partially reduced at 400° to 700° C., by CO or like gas, to FeO and/or MnO and reused in (1). Nitrogen is preferred for fluidification of the reactive masses and in one form of apparatus also acts as a fluid valve or seal to confine and direct the evolved gases to their proper exits.

---

Figure 1:
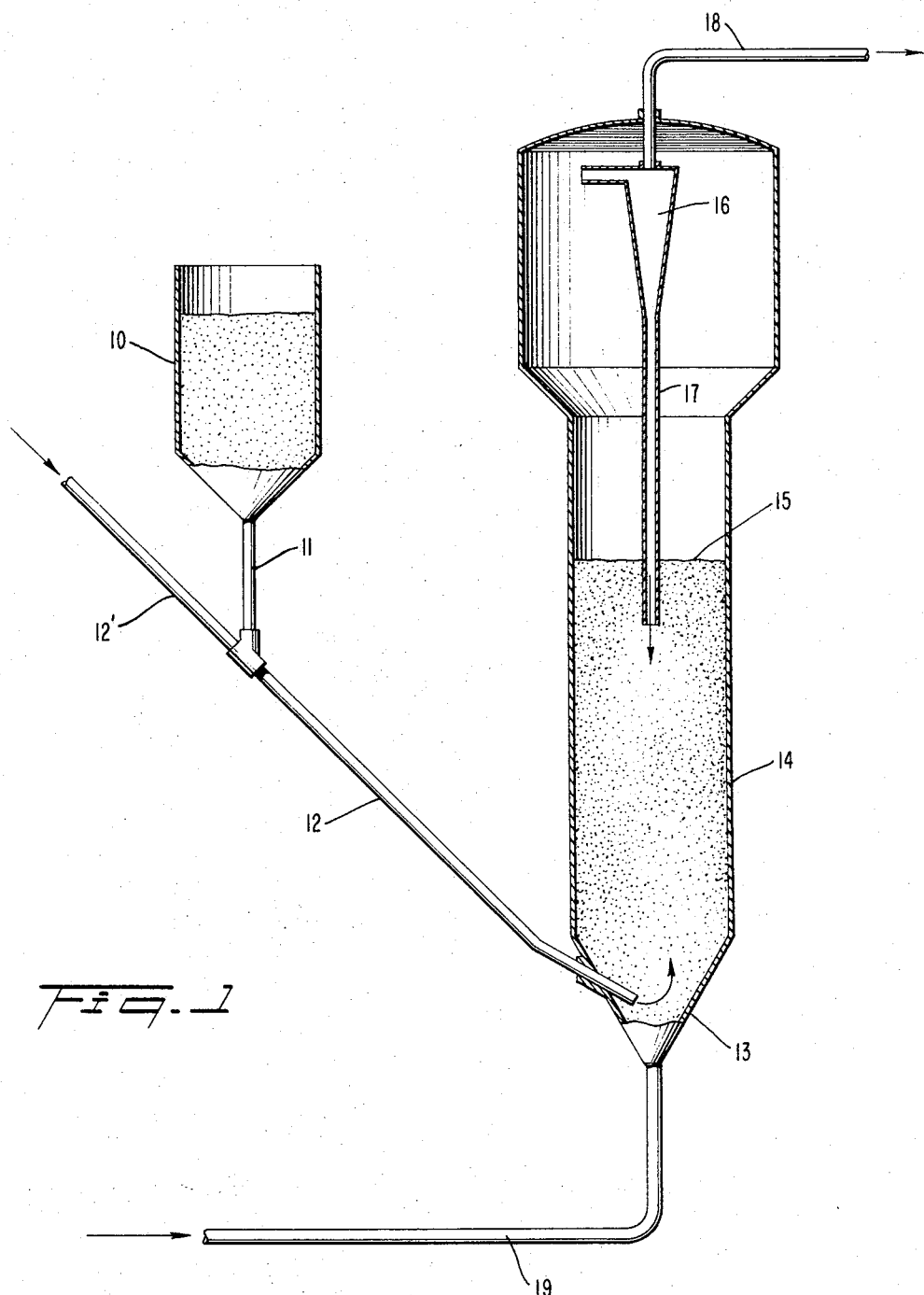

This invention relates to a process for preparing ammonia and chlorine from ammonium chloride. The invention also includes novel and efficient apparatus for carrying out the process. The invention also relates to novel catalysts for the process and to methods of preparing them.

It has already been proposed in a manner not anticipatory of the present invention to prepare ammonia and gaseous chlorine from ammonium chloride by decomposing the ammonium chloride in the presence of a catalyst mass containing a partially reduced metallic oxide and an alkali metal salt. In the preferred form of that process the catalyst mass was composed of an intimate mixture of iron sesquioxide ($Fe_2O_3$) or manganese sesquioxide ($Mn_2O_3$) and potassium chloride in the molecular ratio of potassium chloride to sesquioxide of about 0.3 to 0.4. Before bringing the catalyst mass and the ammonium chloride together, the mass was treated with a current of reducing gas so as to partially reduce the metallic oxide; in the next step the ammonium chloride was mixed with the catalyst mass, which fixed hydrochloric acid in the mass and released ammonia. In another step the catalyst hydrochloride was treated with gas containing oxygen, which liberated the chlorine in elemental form and oxidized the catalyst. After the chlorine was released the catalyst could be regenerated by partial reduction and returned to use.

In an improvement on that process, also regarded as not anticipatory, it was proposed to associate a copper compound with the metallic mass, cuprous chloride being preferred, in the molecular ratio to sesquioxide of between about 0.3 and 1.0. The alkali metal chloride, preferably potassium chloride, was then associated with the metallic mass in a molecular ratio of potassium chloride to iron or manganese sesquioxide between 0.2 and 2.5.

The operation of that process was by means of a catalyst-fixative mass composed of granules which might be somewhat aggregated, fixed in position, or even moving in substantially parallel lines, and this has developed certain inconveniences; the temperature tends to differ in different parts of the mass and local overheating may occur and cause corrosion and loss of volatile materials such as ferric chloride; the contacts between the reactants and the catalyst-fixative mass are reduced because they proceed largely by molecular diffusion; and the granules have a tendency to agglomerate especially during the fixation of the hydrochloric acid. Another difficulty is that the apparatus for carrying out the series of reactions which is involved in this process has been underdeveloped and not too efficient. Yet another difficulty has been that the catalyst, which while efficient, has not been in its most efficient form.

It is an object of this invention to improve the basic reaction, to separate the steps thereof so that they proceed in isolation from each other, to prevent the mingling of reaction products, to improve the apparatus, to improve the catalyst-fixative, and to provide a continuously operating cyclic process.

The present invention prepares ammonia and chlorine from ammonium chloride by putting ammonium chloride in contact with a catalyst-fixative mass containing metallic oxides such as those of the iron-manganese group, which are in a partially reduced state, the hydrochloric acid resulting from dissociation of the ammonium chloride being accompanied by the release of ammonia and the fixing of hydrochloric acid on the mass, the catalyst mass after the departure of ammonia being oxidized by a gas containing oxygen which releases the chlorine, the metallic oxide being reduced after the release of chlorine by a reductive gas so that it can be recycled for further use. It is also a part of the invention to carry out substantial portions of the reaction in fluidized beds. Beds are in a state of fluidification when they are maintained in such a condition of particulate agitation that they act as though they were liquid. The process of the invention is carried out continuously according to the invention by circulating the catalyst-fixative mass in a closed circuit so that it comes in contact successively with reactants which are either gaseous or capable of becoming such at the temperature of the operation, the contact of the several reactants with the catalyst mass being within the fluidified bed. On the other hand it is within the scope of the invention to put the invention into use in batch or semi-continuous processes.

The process of this invention involves the following four basic reactions, which occur in sequence:

(A) $2NH_4Cl \rightleftharpoons 2NH_3 + 2HCl$
(B) $2NH_3 + 2HCl + FeO \rightarrow FeCl_2 + 2NH_3 + \frac{1}{2}H_2O$
(C) $FeCl_2 + \frac{3}{4}O_2 \rightarrow \frac{1}{2}Fe_2O_3 + Cl_2$
(D) $\frac{1}{2}Fe_2O_3 + \frac{1}{2}CO \rightarrow FeO + \frac{1}{2}CO_2$ It will be understood that the FeO is representative of partially reduced oxides of the iron-manganese series, and that reaction C is an overall representation. Analogous equations will be written by replacing FeO by $Fe_3O_4$, or by partly reduced MnO or the like.

It is also part of the invention to circulate the finely divided catalyst mass between the different reaction stations by pneumatic conveyors and gravity flow. Other transporting means can be used between steps without exceeding the scope of the invention but pneumatic transportation is preferred as it assists in maintaining the fine division and fluidification of the catalyst mass. Other suggested conveyors are of screw type or Godet type.

The catalyst mass preferably includes an alkali metal salt of which potassium chloride is especially efficient and which is present in a ratio to $Fe_2O_3$ between about 0.2 and 2.5. In general one makes up this mixture, in the continuous cycle, so as to produce at the start of the liberation of chlorine a molecular ratio $$\frac{Cl(KCl)}{Cl \text{ (fixed on iron oxides)}} \text{ above } \frac{1}{3}$$

The catalyst mass may also contain inert solids and promoters of activation such as the salts of rare earth metals, salts of copper and salts of zinc, these promoters being taken singly or in any combination.

In the preferred form of the invention the catalyst-fixative mass is prepared from a natural mineral of substantial iron content, the iron being at least partially present as an oxide, hydroxide, or carbonate or in some other form which is already transformed to oxide or to iron chloride. For example, minerals such as oligist, hematite, magnetite, siderite, limonite, and ferriferous bauxite are useful. The content of iron in the mineral, expressed as a weight percentage of iron sesquioxide $Fe_2O_3$ to the weight of the mineral, is preferably between 15 and 75%. In addition to the use of the natural mineral artificial minerals and minerals natural or artificial which have been enriched in their iron content may be used. Before being used, the mineral is crushed and finely divided so that the resulting particles are generally between 20 microns and 1 mm. in diameter, the efficiency of particles lying between 20 and 250 microns in diameter being particularly favorable. The ratio of potassium chloride to $Fe_2O_3$ remains substantially the same and the inert fillers and activators referred to may also be employed. Salts of zinc may be used to replace or in combination with the salts of copper as described above. The size of the grains of the adjuvants are desirably of the same size as those of the catalyst. It is advantageous to dehydrate the iron mineral or the catalyst-fixative at any time prior to its use by means such as calcination at temperatures between 500° and 1000° C. In one method the operation is carried out cyclicly in one or more reactors which contain a permanent charge of catalyst in a fluidized state. According to another method the process is continuously carried out in a series of reactors containing fluidized beds between which the catalyst-fixative mass continuously circulates.

According to the invention we preferably use catalyst masses which are sufficiently hard and resistant to fragmentation to withstand the uses of the process, the division of which is in grains small enough to be readily transported pneumatically, and which are also sufficiently fine to be readily fluidized.

The major part of such masses should be constituted by particles having a diameter between 20 microns and 1 mm. and preferably between 20 microns and 250 microns. To achieve this constitution of the catalytic mass natural minerals are particularly useful.

In one of the forms of the invention the process is carried out in a single reactor which contains a fluidized bed, the various steps, including regeneration of the catalyst, being carried out in the reactor in sequence. According to another and preferred form of the invention the process is made continuous by piping the reactants through a series of reactors containing fluidized beds into and from which the catalytic mass circulates continuously. A particular advantage of this invention is that ammonia and chlorine are prepared from ammonium chloride under industrial conditions which are both economically and technically superior to those which have heretofore been known.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a diagrammatic view in vertical section of an apparatus in which the process is carried out in a sequence of steps in the same place; and FIG. 2 is a diagrammatic view in vertical section of an apparatus in which the different steps of the process are carried out at different locations and in which there is a continuous circulation of the catalyst-fixative mass.

Referring to FIG. 1 the fixed position reaction takes place as follows:

A hopper 10 supplies ammonium chloride powder of the fineness described hereinabove through a conduit 11 and a conduit 12 to the conical bottom portion 13 of a cylindrical reaction chamber 14. This reaction chamber contains a partly reduced iron or manganese oxide, or a mixture of them, which is to act as the catalyst-fixative. The reaction which occurs is represented by the following two equations:

(1) 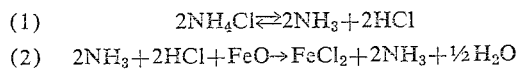 $2NH_4Cl \rightleftarrows 2NH_3 + 2HCl$ (2) $2NH_3 + 2HCl + FeO \rightarrow FeCl_2 + 2NH_3 + \frac{1}{2}H_2O$ These reactions are carried out at 350° to 500° C. and the reactor 14 will be heated to a temperature in that range. The conduit 12 may also be heated in that range and appropriate check valves will be located in the conduit 11 to prevent the pressure generated by the vaporization of ammonium chloride from backing up into the hopper 10. The ammonium chloride as gas or preferably as solid is admitted to the reactants, at a velocity and volume which are sufficient to maintain the catalyst in a fluidified state. The gases which escape from above the level 15 of the catalyst in the chamber are largely ammonia, suspending some fine dust. These gases enter the cyclone separator 16, the solids falling back into the catalyst mass through the conduit 17 and the ammonia passing off through the conduit 18 together with some water vapor.

After the first reaction has been completed and the release of ammonia has been reduced to an inconsequential amount a gas containing oxygen is admitted to the bottom of the cone 13 through a conduit 19, giving rise to the following reaction:

(3) 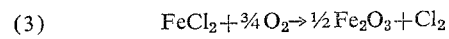 $FeCl_2 + \frac{3}{4}O_2 \rightarrow \frac{1}{2}Fe_2O_3 + Cl_2$

For this reaction the temperature is raised to 450° to 650° C. which release the chlorine and oxidizes the iron. After the chlorine has been passed off and separated from entrained powder in the cyclone a flow of reducing gas, for instance hydrogen, illuminating gas, or carbon oxide is admitted to the bottom of the chamber 14, either through the line 12' or the line 19. This brings about the regeneration of the catalyst according to the following equation:

(4) 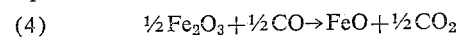 $\frac{1}{2}Fe_2O_3 + \frac{1}{2}CO \rightarrow FeO + \frac{1}{2}CO_2$ During this period of regeneration the temperature in the reactor is held between 400° and 700° C. After the catalyst has been partially reduced a new cycle may be begun.

During the entire process the flow of gas is maintained at a volume and velocity which keeps the particles in a fluidified state. What this volume and velocity will be, depends upon the size of the chamber and the depth of the solids. To attain it, one simply increases the flow of gas until fluidification occurs.

The authorities have different figures for the temperature of sublimation of $NH_4Cl$. Under the circumstances of the present process it sublimes at 337.8° C.

The invention may also be carried out in novel apparatus which is diagrammatically illustrated in FIG. 2. Not only is the apparatus as a whole novel in concept and construction, but many elements in it are also novel in concept and construction. In this figure the conduit 23 supplies catalyst through a valve V to a reaction chamber 20, which is a cylindrical chamber having a conical base 21 terminating in an aspirator nozzle 22. Solid ammonium chloride is admitted from pipe 24 through a similar valve to the interior of the chamber. The chamber is heated by any satisfactory means to a temperature above the sublimation temperature of ammonium chloride and preferably between 350° and 500° C. Inert gases such as $CO_2$ and nitrogen flow through a conduit 25 and a similar valve into the bottom of the reaction chamber, the flow establishing and maintaining a fluidified condition in the reaction mass. As the ammonium chloride vapor sublimes it flows accompanied by inert gas through pipe 26, which issues from the top of the reaction chamber and is laterally joined to the aspirator 22, so that the gases passing by the aspirator nozzle entrain and suspend the fine powder of the catalyst. The following reaction is in being at this stage:

(5)
$$2NH_4Cl \stackrel{FeO}{\rightleftarrows} 2NH_3 + 2HCl - FeO$$

The conduit 26 is extended at 26', is maintained at reactive temperature and the gases and solids are admitted to the bottom of reactor 27, where a grid G distributes the flow evenly across the bottom of the chamber. Eventually the chamber will be filled to about the level 27' with the catalyst-fixative mass, which is maintained in a fluidified condition from the flow from pipe 26'. A cyclone 27" separates the ammonium from entrained solids and the ammonia flows off through pipe 27''' to a separator 28 in which there is a heat exchange coil 29. In this separator the ammonia passes off as a gas through pipe 29' to storage apparatus, and a solution of ammonia in water passes off through pipe 29".

The reactor 27 is maintained at 350° to 500° C. and the reactions which occur are represented as follows:

(6) $2NH_3 + 2HCl + FeO + HCl \cdot FeO \rightarrow FeCl_2 + 2NH_3 + \frac{1}{2}H_2O$ The first part of this equation is most evident below the grid G and the second part in the upper part of the reaction mass, it being understood that the reaction mass is continually progressing upward and pouring into a conduit 30 which opens out of the side of the chamber and discharges toward the bottom of a chamber 31. The main constituent of this powder are $FeCl_2$ and $Fe_2O_3$. The chamber 31 has a conical bottom which is served by a conduit 32 through which nitrogen gas is admitted at a velocity sufficient to fluidify the particulate material. After a short period of operation, the level of the fluidified material rises above the conduit 33 and the fluidified materials pour into the reaction chamber 34.

The chamber 31 is called a gas trap, the construction and function of which are believed to be novel. The nitrogen which is admitted to this chamber passes upward through the conduit 30 and downward through the conduit 33, both of which are large enough to permit the flow of gas without blocking the flow of solids. As a consequence of this construction ammonia is prevented from escaping through conduit 30 from the reactor 27, and the products of reactor 34 are prevented from making their way into the gas trap.

The reactor 34 is constructed like reactor 27 but reactive oxygen is admitted through the conduit 35 and the following reaction takes place:

(7) $\frac{3}{4}O_2 + FeCl_2 \rightarrow \frac{1}{2}Fe_2O_3 + Cl_2$ (450°–650° C.)

A cyclone 36 separates the reactive gases from entrained solids and the gases flow through a conduit 37 to a separator 38 which condenses water vapor or the like and allows chlorine gas to pass off to a receptacle through a pipe 39. The level of the fluidified mass in reaction chamber 34 will be above the level of discharge pipe 40, which discharges toward the bottom of gas trap 41, which is constructed like and operates as does 31. Nitrogen gas or other inert gases may be admitted through a pipe 41'. The conduit 42, the top of which is above the level of the fluidified solids, conducts its solids to the reaction chamber 45. Carbon oxide is admitted through conduit 45'. A cyclone 46 separates solids and gases. A condenser 47 receives the gases from the cyclone through pipe 46' and $CO_2$ escapes. The reaction which occurs in chamber 45 is as follows:

(8) $\frac{1}{2}Fe_2O_3 + \frac{1}{2}CO \rightarrow FeO + \frac{1}{2}CO_2$ (400°–700° C.)

The catalyst has now been regenerated, that is to say partially reduced, its level is above that of discharge conduit 50, and a gas trap 51, supplied with nitrogen through conduit 52, performs the same function between reactor 45 and the pressure compensator 55. $CO_2$ and nitrogen are discharged from the pipe 25 and regenerated catalyst, partly reduced metallic oxide, flows through a valve V into the reaction chamber 20.

In this process there is a continuous flow of fluidified catalyst from reaction chamber to reaction chamber, the reaction chambers being separated by valveless connections which prevent gaseous media from flowing from one chamber to another. Except for the reactor 20 the system works not far from atmospheric pressure.

In order to obtain appropriate temperatures easily in the different stages of reaction it is advantageous to maintain a ratio of the weight of iron to the catalytic mass between 5 and 35%, when the catalytic mass contains alumina. The ammonium chloride put to work in the process is generally less than the quantity of iron oxide present. During the liberation of chlorine the oxidation of ferrous oxide which has not been chlorinated produces a part of the heat which is necessary to the thermal equilibrium of the cycle. This also favors the establishment of appropriate temperature in each of the reactors and in particular in the reactor wherein the chlorine is liberated.

In the operation of the device of FIG. 1 the reactor is charged with hot catalyst to which ammonium chloride is progressively admitted, preferably as a powder. The ammonium chloride sublimes and dissociates into ammonia and HCl in contact with the hot catalytic mass. The vapors which evolve from the ammonium chloride entrain, and maintain the fluidization of, the particles of the catalytic mass. The hydrochloric acid then fixes itself on the catalytic mass and the ammonia vapors are released and captured. During the operation of fixation the temperature is generally between 350° and 500° C., preferably near 420° C. When the release of ammonia ends one introduces into the reactor a current of oxygenated gas such as air or oxygen which maintains the catalytic mass in fluidized condition while displacing the chlorine liberated by the reaction. While chlorine is being liberated at a temperature between 450° and 650° C. and preferably at about 500° C., it is advantageous to terminate the admission of oxygen, and the release of chlorine, before complete dechlorination has occurred. This presents the double advantage of establishing high chlorine content in the effluent and of facilitating the thermal balance.

When one carries out several complete operations in succession the catalyst mass attains a composition which is practically constant from one operation to another and the apparatus discharges a quantity of chlorine substantially equal to that which is introduced as ammonium chloride. When the release of chlorine ends a current of reductive gas is admitted to the reactor which fluidifies the catalytic mass and reduces the catalytic oxides to a lower state of oxidation. It is equally possible to accomplish this regeneration by means of a mixture of reductive gases and a small quantity of air or other oxygenated gas. A part of the reducing gas is then burned by the oxygen, and the heat produced favors the establishment of thermal balance in the cycle. During the regeneration the temperature is maintained between 400° and 650° C. and preferably between 500° and 550° C. The catalytic mass, thus regenerated, may then be submitted to a new cycle.

In operating the apparatus of FIG. 2, in the first step solid ammonium chloride is put in contact with the catalytic mass and a partial sublimation and dissociation into ammonia and HCl occurs. It is advantageous to admit the solid ammonium chloride and the regenerated hot catalyst together. The heat of sublimation is provided by the hot catalyst and by the heat of reaction. The vapors which issue from the ammonium chloride maintain the particles in fluidized state and the pressure of sublimation is used to entrain the mass toward the reactor where the fixation of HCl takes place. The temperature is between 350° and 500° C. and preferably at about 420° C. The reaction of fixation proceeds during the flow to the second reactor. In the second step the fixation of HCl is substantially completed and the ammonia and water vapor which are released are discharged and recovered. This operation is preferably carried out in a fluidized reaction mass into which there is continuously fed, pneumatically, a mixture of catalyst and products from the disintegration of ammonium chloride. This operation is at 350° to 500° C. and preferably at 420° C. The effluent vapors containing ammonia and water are separated from the solid particles of catalyst mass by any satisfactory means, a cyclone being shown. The gaseous mixture which escapes is treated by known processes to recover the valuable constituents.

The chlorinated mass resulting from this operation flows continuously out of the reactor and it is separated from residual ammonia and water in an annexed gas trap by means of a current of inert gas a part of which is reunited with the gases issuing from the chlorinating reactor and the rest of which, with the chlorinated catalytic mass, flows toward the next reactor.

During the third step the oxidation of the chlorinated catalytic mass by gas containing oxygen is accomplished and elemental chlorine is liberated with unused oxygen. This operation is preferably carried out in a fluidized bed by the continuous introduction on one hand of the chlorinated catalyst coming from the preceding reactor and on the other hand of a gas containing oxygen which puts the catalyst in a fluidized state. This operation occurs between 450° and 650° C. and preferably near 500° to 520° C.

The gas containing chlorine is separated from the solid particles of catalytic mass and discharged by means of a cyclone. During this operation it is better not to liberate all of the chlorine fixed on the iron. The quantity of chlorine liberated corresponds approximately to the quantity introduced as ammonium chloride. The chloride not liberated remains in the catalyst and favors the overall thermal balance of the apparatus and the maintenance of appropriate temperatures in each part of the circuit, especially in the dechlorination and reduction reactors.

The oxidized catalyst resulting from this operation flows continuously out of the reactor and is separated from residual chlorine vapors in an adjacent gas trap by means of a current of inert gas such as nitrogen, which fluidizes the bed. The gas containing chlorine issuing from this apparatus is united with that issuing from the oxidation reactor and the oxidized catalytic mass is sent toward the reactor of regeneration.

In the course of this fourth step the reduction of the oxidized catalyst by means of a reducing gas takes place and the catalytic mass is regenerated to its original state. This regeneration is carried out in a fluidized bed which continuously receives oxidized catalyst coming from the oxidation reactor and reducing gases such as CO, H, water gas, or illuminating gas which are used to maintain the fluidized state. CO or gas containing it are preferred because $CO_2$ is formed and this can be used in the manufacture of sodium carbonate by the ammonia process. This fourth step is carried out between 400° and 700° C. and preferably between 500° and 550° C. The oxidized gases are separated from the solid particles by any satisfactory means, the cyclone being shown.

The temperature of the reduction reactor is regulated by the catalytic mass and the amount of the reducing gas introduced. It is also possible to introduce a certain quantity of air or oxygen with the reducing gas so as to raise the temperature in the reactor by burning a part of the reducing gas. The regenerated catalyst mass resulting from the regeneration is regularly returned to the reactor after separation of residual gases in appropriate apparatus, preferably employing a fluidized bed and a current of inert gas in this operation. A bed of the effluent gas is united with the gas issuing from the regenerator and the rest of the gas as well as the catalytic mass is again introduced at the start of the cycle.

There are several modes of carrying out the different operative procedures of this method. For example one may introduce solid ammonium chloride directly into the reactor which fixes the hydrochloric acid, in which case one also uses the reducing gas and a gas to fluidify the bed. It is equally possible to supply the gas traps with small quantities of air rather than with inert gases but this is not preferred.

Modifications of the process and of the apparatus may be made without departing from the invention. For example, it is possible to introduce ammonium chloride in partially or totally vaporized form. It is possible to carry out one of several of the steps of the process in batteries of reactors disposed in series or in parallel. The following examples illustrate the invention without detracting from the generality of what is elsewhere herein stated.

Example

Using the apparatus represented in FIG. 2, which includes a sublimer and three fluidized bed reactors 100 mm. in diameter and 100 cm. high, a catalyst-fixative mass of alumina and 23% by weight of $Fe_2O_3$, of which the major part of the catalyst mass was retained between the openings of screens 20 and 250 microns respectively, was put into the sublimer. There was mixed with the catalyst a quantity of KCl sufficient to produce a molar ratio of KCl to iron equal to 0.6. Before the catalyst was put into use it was treated with illuminating gas until a ratio of $Fe_{3+}$ to Fe total equal to 1:3 was attained. The sublimer 11 was continuously supplied with a flow of the catalyst and of solid ammonium chloride. The ammonium chloride flowed into the apparatus at a rate of 735 g./hr. and the catalyst mass was largely recycled, about 10.2% of the iron of which was $FeCl_2$, and the flow into the sublimer was at about 24 kg./hr., as established at the valve.

The first reactor was supplied continuously from the sublimer with catalyst and gases which include vaporized ammonium chloride and its products of decomposition. These gases acted to carry the catalyst powder into the reactor and to fluidize the bed of catalyst in it. In this first reactor the fixation of HCl on the catalyst mass was substantially completed. The depth of the catalyst bed in the reactor was about 60 cm. and the temperature was kept at about 420° C. About 97.6% of the HCl was fixed on the catalyst and the corresponding ammonia left the reactor as an inert gas to be recovered by apparatus not shown.

The chlorinated catalyst flowed out of the reactor by the conduit into the gas trap, into which there was flowing a current of nitrogen at a rate of 150 l./hr. through the inlet at the base of the cone. The catalytic mass, freed of residual gas, and of which 20.3% was $FeCl_2$, then flowed through the upper conduit into the second reactor in which the oxidation occurred. A current of oxygen was admitted to this reactor at a rate of 675 l./hr. through the bottom conduit. The depth of the bed, which was fluidized by the oxygen, was about 60 cm. The heat released by the oxidation of the catalytic hydrochloride maintained the temperature at about 500° C. About 478 g./hr. of chlorine escaped through the orifice of discharge, amounting to 98% of chlorine introduced as ammonium chloride. The oxidized catalyst flowed into the next gas trap and was maintained in fluidized condition by a flow of 150 l./hr. of nitrogen. At this stage about 7.2% of the catalytic iron was $FeCl_3$ and the remainder was $Fe_2O_3$. The catalytic mass was freed from the residual gas in the gas trap and poured through the upper conduit into the third reactor, in which the regeneration of the oxidized mass, its partial reduction, was carried out by a flow of illuminating gas. The depth of the bed was about 60 cm. and the temperature of the catalyst mass was about 500° C. during the regeneration. The regenerated mass had a ratio of $Fe_{2+}$ to Fe total of 1:3. It flowed through the upper conduit into the final gas trap where it was suspended and fluidized by 150 l./hr. of nitrogen. This regenerated catalyst freed from residual gases flowed into the pressure regulator 55 and was returned to the sublimer.

The use of fluidized beds, which constitutes a part of this invention, permits high reaction speed and high yields of ammonia and chlorine. Another advantage resides in the uniformity of the catalyst-fixative mass and in the uniformity of the temperatures which are maintained in the reaction chambers. By using fluidized beds the agglomeration of the catalyst mass is prevented. In a preferred method of carrying out the process the use of a single gas as the propulsive agent in the whole circuit avoids the intermediate recovery steps applicable to the catalytic mass and the regulatory steps and apparatus characteristic of the prior art. When the chlorination of ferrorus oxide is only partial, and when the dechlorination of the iron oxides is only partially achieved, one may provide for the release of a quantity of calories sufficient to maintain the thermal balance of the whole cycle without using any heat exchanger on the walls or in the circuit followed by the catalyst mass. Heat can be generated economically by the use of gases containing small amounts of oxygen in the reactor used for regeneration.

The cyclic process, proceeding continuously in a closed circuit, notably simplifies the construction of the apparatus and its industrial exploitation. The process and the apparatus of the present invention are particularly adapted to the recovery of ammonium chloride, which appears as an intermediate product in the preparation of sodium carbonate by the ammonium process. As a consequence it is possible to insert the ammonia liberated into the cycle for the preparation of sodium carbonate and to recover in elemental form the chlorine which would otherwise be lost. It is particularly important that, in the preferred form of the invention, which uses carbon oxide as the reducing gas, $CO_2$ gas is produced in such quantities that it furnishes a sufficient supply of that gas for the preparation of sodium carbonate by the ammonia process.

As many apparently widely different embodiments of the present invention may be made without departing from the spirit and scope thereof, it is to be understood that the invention is not limited to the specific embodiments.

What is claimed is:

1. In the method of continuously obtaining ammonia gas and chlorine from the dissociation of ammonium chloride through the use of an iron oxide and an alkali metal chloride containing catalyst mass, the improvement which comprises performing simultaneously: introducing into a first reaction zone and there intimately mixing ammonium chloride and regenerated hot catalyst comprising partially reduced ferric oxide, thereby causing the sublimation of the ammonium chloride, passing a mixture of catalyst entrained in gaseous ammonium chloride to a second reaction zone containing a fluidized mass of ammonium chloride and catalyst at about 350° C. to 500° C., withdrawing and collecting gaseous ammonia from said second reaction zone, passing the resulting ferrous chloride and partially reduced ferric oxide of said reactive mass to a third reaction zone containing a mass of reactive $FeCl_2$ and $Fe_2O_3$ at about 450° C. to 650° C., introducing a gas containing oxygen into a third reaction zone to fluidize the reactive mass therein and to react with the ferrous chloride to free chlorine, withdrawing and collecting chlorine from said third reaction zone, passing the resulting $Fe_2O_3$ from said third reaction zone into a $Fe_2O_3$ containing fourth reaction zone at about 400° C. to about 700° C. to fluidize the reactive mass therein by introducing a reducing gas and to produce partially reduced ferric oxide as the said regenerated hot catalyst, and passing this regenerated catalyst into said first reaction zone for mixture therein with fresh ammonium chloride passing thereto, the entire process being conducted in substantially overall thermal balance.

2. A process according to claim 1 in which the $Fe_2O_3$ containing reactive mass from the third reaction zone has a molar ratio $$\frac{\text{alkali metal chloride}}{Fe_2O_3}$$

ranging from 0.2 to 2.5.

3. A process according to claim 1 in which at the start of the liberation of chlorine in the third reaction zone the molar ratio $$\frac{\text{Cl (alkali metal chloride)}}{\text{Cl (fixed on iron oxide)}} > \frac{1}{3}$$

is established.

4. A process according to claim 1 in which in the second reaction zone the chlorination of ferrous oxide is only partial, and in the third reaction zone the dechlorination of the iron oxides is only partially achieved.

5. A process according to claim 1 in which in the fourth reaction zone a quantity of air or oxygen is introduced with the reducing gas in an amount sufficient to burn apart of the reducing gas to raise the temperature in the reactor.

References Cited

UNITED STATES PATENTS

| | | | |
|---|---|---|---|
| 379,488 | 3/1888 | Mond | 23—193 |
| 2,204,733 | 6/1940 | Miller | 23—219 |
| 2,542,464 | 2/1951 | Black et al. | 252—441 |
| 3,260,678 | 7/1966 | Engel et al. | 23—219 |

OSCAR R. VERTIZ, *Primary Examiner.*

H. S. MILLER, *Assistant Examiner.*